No. 736,087. PATENTED AUG. 11, 1903.
J. G. GRAHAM.
APPARATUS FOR MAKING SULFURIC OR OTHER ACIDS.
APPLICATION FILED MAR. 31, 1903.
NO MODEL. 4 SHEETS—SHEET 1.
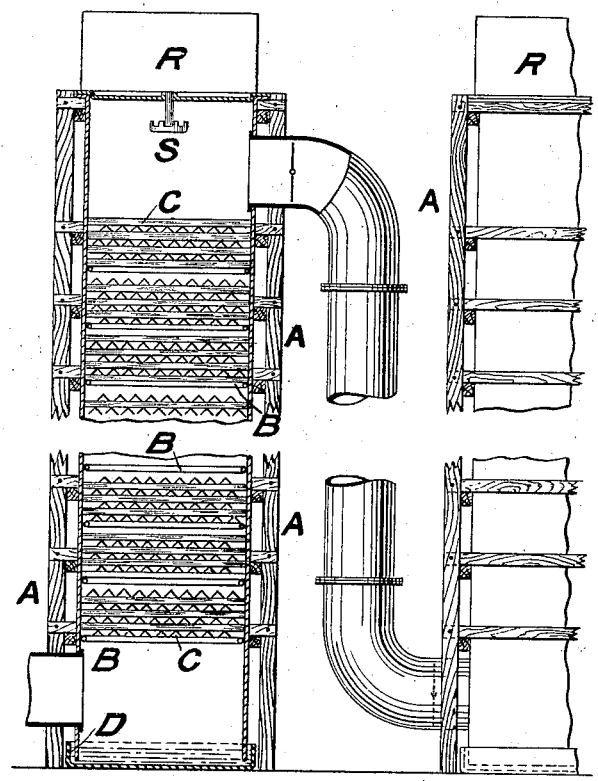
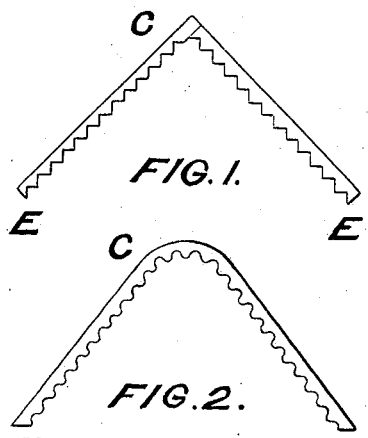
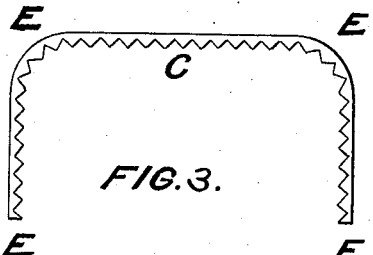
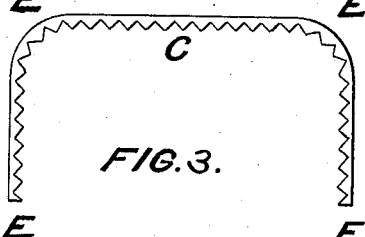
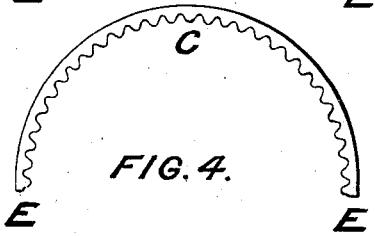
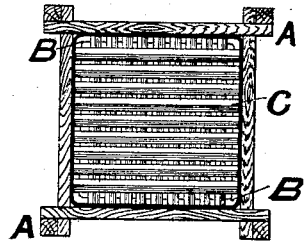
WITNESSES.
Joseph Bates.
E. Howard.
INVENTOR.
John G. Graham
by
I. Warren O'Brien
atty No. 736,087. PATENTED AUG. 11, 1903.
J. G. GRAHAM.
APPARATUS FOR MAKING SULFURIC OR OTHER ACIDS.
APPLICATION FILED MAR. 31, 1903.
NO MODEL. 4 SHEETS—SHEET 2.

WITNESSES.
Joseph Bates.
E. Howard.

INVENTOR.
John G. Graham
by J. Edward O'Brien
atty.

No. 736,087. PATENTED AUG. 11, 1903.
J. G. GRAHAM.
APPARATUS FOR MAKING SULFURIC OR OTHER ACIDS.
APPLICATION FILED MAR. 31, 1903.
NO MODEL. 4 SHEETS—SHEET 3.

WITNESSES.
Joseph Bates.
E. Howard.

INVENTOR.
John G. Graham
by J. O'Waine O'Brien
atty.

No. 736,087. PATENTED AUG. 11, 1903.
J. G. GRAHAM.
APPARATUS FOR MAKING SULFURIC OR OTHER ACIDS.
APPLICATION FILED MAR. 31, 1903.
NO MODEL. 4 SHEETS—SHEET 4.

WITNESSES.
Joseph Bates.
E. Howard.

INVENTOR.
John G. Graham
by D. Owen O'Brien
atty.

No. 736,087. Patented August 11, 1903.

UNITED STATES PATENT OFFICE.

JOHN G. GRAHAM, OF BRAMHALL, STOCKPORT, ENGLAND.

APPARATUS FOR MAKING SULFURIC OR OTHER ACIDS.

SPECIFICATION forming part of Letters Patent No. 736,087, dated August 11, 1903.

Application filed March 31, 1903. Serial No. 150,456. (No model.)

*To all whom it may concern:*

Be it known that I, JOHN GUTHRIE GRAHAM, a British subject, and a resident of Bramhall, Stockport, in the county of Chester, England, have invented certain new and useful Improvements in Apparatus for Making Sulfuric and other Acids, of which the following is a specification.

This invention relates to the manufacture of sulfuric, hydrochloric, nitric, and other acids, and is designed to provide improvements in and relating to apparatus for readily and effectively breaking up, mixing or assimilating, and condensing the gases in such manufacture, particularly in that of sulfuric acid.

At present in the manufacture of sulfuric acid one or more (generally three) large chambers are used for the mixing and condensation of the gases into the liquid acid, which chambers cover a large space and are very costly to erect. My invention is designed to dispense with these chambers or where they are already erected to increase and improve the output from the plant.

The invention will be fully described with reference to the accompanying drawings, in which apparatus and plant designed for the manufacture of sulfuric acid are shown.

Figure 8:
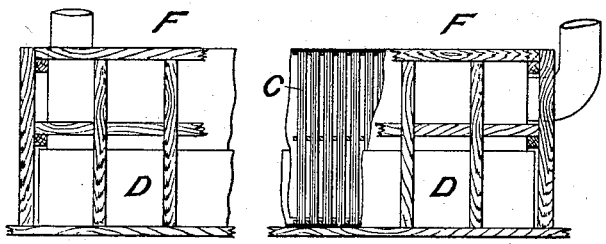
Figure 7:
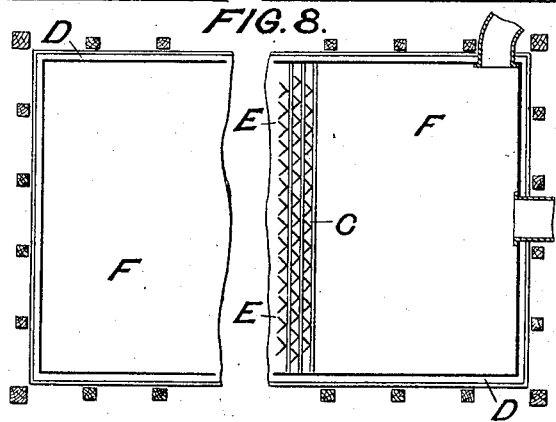
Figure 9:
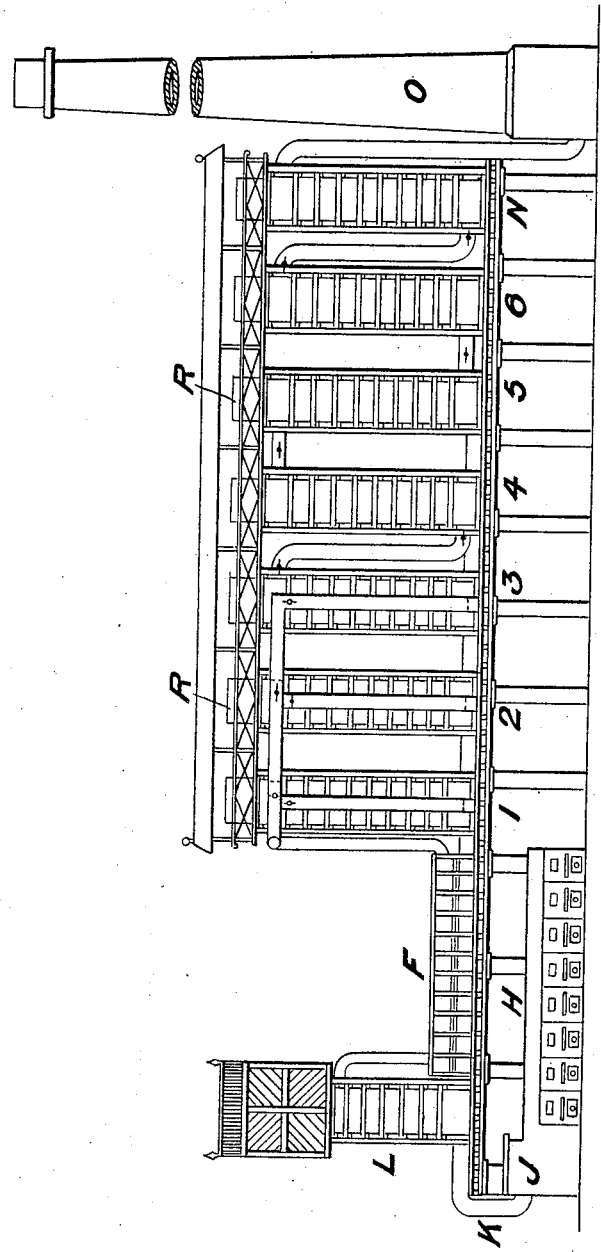
Figure 10:
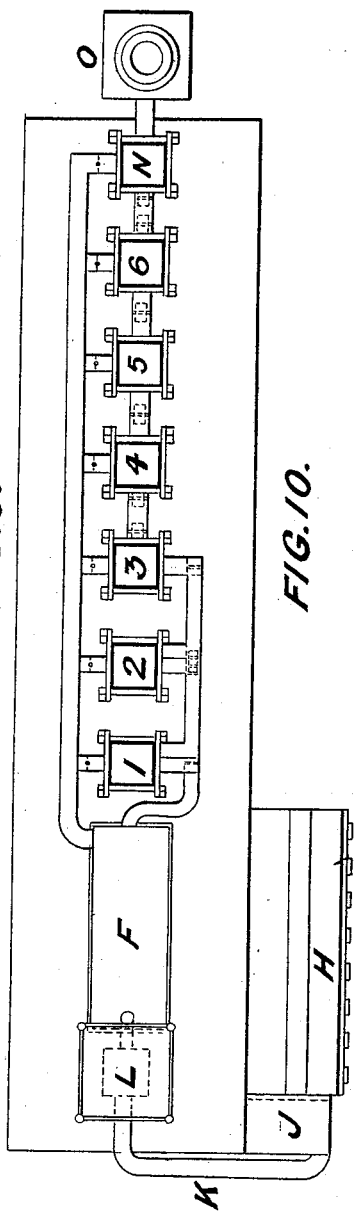
Figure 11:
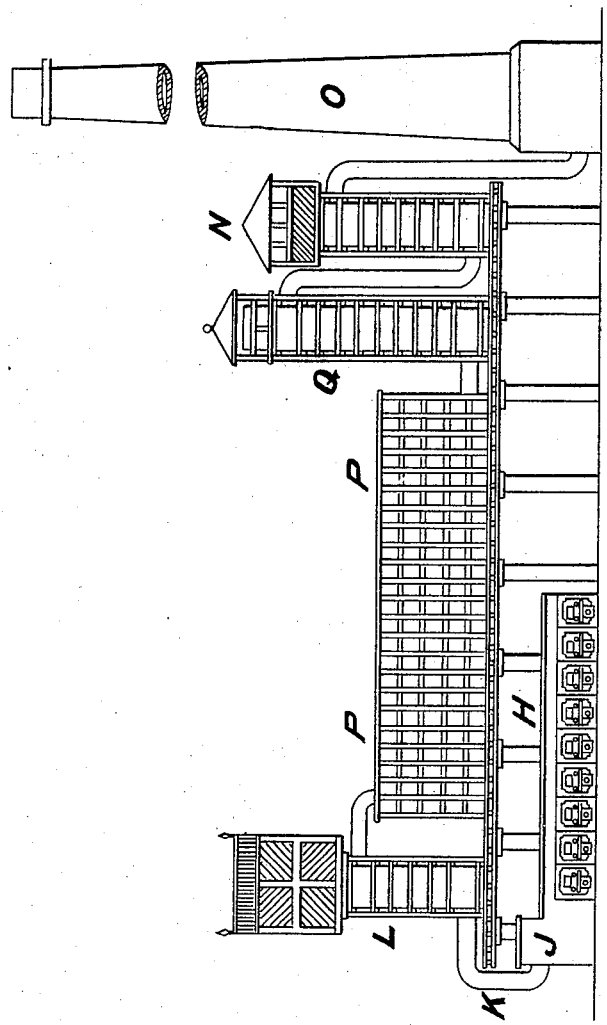

Figures 1 to 4 show sections of different shapes of contact-pieces; Fig. 5, sectional elevation of my "contact-column" provided with the "obstruction" or "contact" pieces; Fig. 6, sectional plan of same; Fig. 7, sectional plan of flue or longitudinal chamber provided with the contact-pieces; Fig. 8, sectional elevation of same; Fig. 9, diagrammatic view of one arrangement of plant constructed entirely upon my "contact" system; Fig. 10, plan of same; Fig. 11, diagrammatic view of plant, showing my contact-column used as an adjunct to the old chamber.

The old sulfuric-acid chambers, which it is the main purpose of this invention to avoid, were required for the mixing and assimilating of the various gases—viz., the sulfur dioxid, steam, and nitrogen trioxid—used in its manufacture. In place of these chambers and for the same purpose I now form flues, passages, or columns provided with a number of contact or obstruction pieces placed across such passages, flues, or columns to break and mix or assimilate and condense the gases. These contact-pieces are made of glass, earthenware, metal, or other suitable material (at present I prefer to use glass) and are of angular, semicircular, channel, or other section, as shown in Figs. 1 to 4. The internal surfaces may be corrugated, as shown, to aid the breaking up and assimilating, or they may be smooth.

Fig. 5 shows the contact-pieces arranged in a column or tower. The framework of this column is constructed of a wooden or other cage A, similar to that of an ordinary Glover or Gay Lussac tower, and lined with lead in the same way. Inside this column brackets or ridges B are formed all around at fixed intervals. Upon these brackets or ledges the contact-pieces C are laid side by side across the column some little distance apart to permit of the gases passing between them. Upon the top of this row of contact-pieces another row is laid at right angles, and so on to the top of the tower, the ridges or brackets B being fixed at intervals, so that the whole weight will not come on the bottom row. The column may be made with a tank R for acid at the top, which passing down through the column aids the condensation, and sprinklers or radiators S may be employed for distributing the acid. The base is formed with the usual "turn-up" D for collecting the liquid acid as it is formed. In working the gases are drawn up through the tower and they are broken up, mixed or assimilated, and condensed by means of the free longitudinal edges E and the angular or other form of the contact-pieces.

In Fig. 7 the contact-pieces are shown as applied to a horizontal flue or chamber F. In this form they are preferably all arranged vertically with their free longitudinal edges E facing in the direction against the flow of the gases. They are so arranged that each row breaks joint with that before and behind it, so that there is no through passage for the gases. This chamber in the same way as the column is provided with a turn-up to collect the condensed acid.

Figs. 5 and 7 show only two ways of applying the contact-pieces; but they may be applied in any other convenient way according to the circumstances of the particular case.

In Figs. 9 and 10 a complete sulfuric-acid plant constructed according to my invention is shown. The burners H and niter-chamber J are connected by a suitable flue K to the Glover or concentrating tower L, from whence the gases pass into a horizontal chamber or flue F, constructed according to my invention with vertically-arranged contact-pieces, as shown in Fig. 7. This chamber also acts as a reservoir for the condensed acid being formed with a high turn-up and into which the turn-ups of all the towers drain. This chamber or flue may be of any suitable dimensions, preferably about sixty or seventy feet long, seven feet high, and fifteen to thirty-two feet wide. From this flue the gases pass through a number of contact-columns 1 2 3 4 5 6, constructed as shown in Fig. 5, and the number of which depends upon the quantity of acid to be produced. For a small plant three are sufficient. The dimensions of the columns are approximately eight feet square by twenty-five to forty feet high. After passing through the towers the gases pass into the ordinary Gay Lussac or absorber tower N and thence to the chimney or stack O.

In this plant I find that the reduction in chamber-space compared to the old system is from fifty to sixty per cent. and the reduction in cost of erection is between fifty and sixty per cent.

Fig. 11 shows the contact-column used as an adjunct of the old chamber. As before, H are the burners, J the niter-chamber, L the Glover tower, but from this the gases pass into the chamber P. Thence they pass into the contact-column Q and to the Gay Lussac tower N and chimney O, as before.

I find that by using my column as an adjunct to an existing plant, using the old chambers, the output of acid from a set of burners can be increased about thirty-three per cent. or more In the manufacture of hydrochloric, nitric, and other acids, where it is necessary that the gases should be broken up, mixed, or assimilated, or condensed, the contact or obstruction pieces may be arranged in any suitable column, chamber, or flue, so as best to obtain the desired result, in a manner similar to that described for sulfuric acid.

I am aware that contact-pieces have heretofore been arranged in acid-condensing columns to break up and mix the gases and, therefore, make no claim, broadly, to the same, my present invention residing in the longitudinal trough-shaped contact-pieces arranged transversely in the chamber or tower.

What I claim as my invention, and desire to protect by Letters Patent, is—

In an apparatus for the manufacture of sulfuric and other acids, the combination with a chamber and means for passing a current of acid gases therethrough, of contact-pieces trough-shaped in cross-section arranged transversely in and extending entirely across said chamber, the hollow sides of said contact-pieces being corrugated and disposed toward the inflowing gases, substantially as described.

In witness whereof I have hereunto signed my name in the presence of two subscribing witnesses.

Dated this 17th day of March, 1903.

JNO. G. GRAHAM.

Witnesses:
J. OWDEN O'BRIEN,
B. LATHAM WOODHEAD.